United States Patent
Chhabra et al.

(10) Patent No.: US 6,885,803 B2
(45) Date of Patent: Apr. 26, 2005

(54) METHOD TO PRODUCE STRESS-FREE OPTICAL WAVEGUIDES TO REDUCE STRESS-INDUCED BIREFRINGENCE IN PLANAR LIGHTWAVE CIRCUIT (PLC) DEVICES

(75) Inventors: Devendra S. Chhabra, San Jose, CA (US); Grace L. Gorman, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 10/619,241

(22) Filed: Jul. 14, 2003

(65) Prior Publication Data

US 2005/0013576 A1 Jan. 20, 2005

(51) Int. Cl.[7] ................................................. G02B 6/10
(52) U.S. Cl. ...................... 385/129; 385/130; 385/131; 385/132
(58) Field of Search ................................. 385/129, 132, 385/14, 124, 131, 141, 144

(56) References Cited

U.S. PATENT DOCUMENTS

| 5,612,171 | A | | 3/1997 | Bhagavatula | 430/321 |
| 6,421,472 | B1 | | 7/2002 | Moroni et al. | 385/14 |
| 6,542,687 | B1 | * | 4/2003 | Won et al. | 385/132 |
| 2002/0074308 | A1 | | 6/2002 | Beguin | 216/2 |
| 2002/0097962 | A1 | | 7/2002 | Yoshimura et al. | 385/50 |
| 2004/0170368 | A1 | * | 9/2004 | Childs et al. | 385/129 |
| 2004/0213535 | A1 | * | 10/2004 | Lee et al. | 385/129 |
| 2004/0247276 | A1 | * | 12/2004 | Bonar et al. | 385/129 |

OTHER PUBLICATIONS

"Single and Multilayer Waveguides and Fabrication Process", Filed Jan. 22, 2001.

"High Precision Alignment of Optical Waveguide Features," Filed Dec. 13, 2000.

* cited by examiner

*Primary Examiner*—Brian Healy
*Assistant Examiner*—Ryan Lepisto
(74) *Attorney, Agent, or Firm*—George O. Saile; Stephen B. Ackerman; Stephen G. Stanton (57) ABSTRACT

A method of forming a waveguide comprising the following steps. A structure is provided. An underclad layer is formed over the structure and a core layer is formed over the underclad layer. Patterning: the core layer to form the waveguide; and partially into the underclad layer, forming an overetched underclad layer having a projection underneath the waveguide. The waveguide having stress gradients and the overetched underclad layer having stress gradients.

91 Claims, 6 Drawing Sheets

Stress Modeling

Underclad 12 and core layers 14 on substrate 10

Stress contours for $\delta xx$
(negative is compressive and
positive is tensile)

FIG. 3

Stress contours for $\delta yy$
(negative is compressive and
positive is tensile)

Waveguide 20' over-etched into underclad layer 12

FIG. 7

Overclad 26 around and on top of waveguide 20'

Stress contours for δ'xx
(negative is compressive and
positive is tensile)

FIG. 10

Stress contours for δ'yy
(negative is compressive and
positive is tensile)

METHOD TO PRODUCE STRESS-FREE OPTICAL WAVEGUIDES TO REDUCE STRESS-INDUCED BIREFRINGENCE IN PLANAR LIGHTWAVE CIRCUIT (PLC) DEVICES

FIELD OF THE INVENTION

The present invention relates generally to optical planar lightwave circuit (PLC) device fabrication and more specifically to methods of forming waveguides.

BACKGROUND OF THE INVENTION

A major cause of stress-induced birefringence is the stresses in the optical waveguides resulting from the mismatch in the thermal expansion coefficients between the substrate and the waveguide material(s). This causes the refractive index and the light propagation properties to be dependent upon the direction of polarization and hence polarization dependent loss.

Conventional methods to reduce the stress in waveguides involve using substrate material with thermal expansion coefficients closely matching that of the core.

U.S. Publication No. 2002/0074308 A1 to Beguin describes a method of manufacturing a planar waveguide with a core and overclad layers.

U.S. Publication No. 2002/0097962 A1 to Yoshimura et al. describes single and multilayer waveguides and processes to fabricate them.

U.S. Pat. No. 6,421,472 B1 to Morani et al. describes an athermalized polymer overclad integrated planar optical waveguide device and method.

U.S. Pat. No. 5,612,171 to Bhagavatula describes planar optical waveguides with planar optical elements.

SUMMARY OF THE INVENTION

Accordingly, it is an object of one or more embodiments of the present invention to provide a method of forming waveguides having reduced stress gradients.

Other objects will appear hereinafter.

It has now been discovered that the above and other objects of the present invention may be accomplished in the following manner. Specifically, a structure is provided. An underclad layer is formed over the structure and a core layer is formed over the underclad layer. Patterning: the core layer to form the waveguide; and partially into the underclad layer, forming an overetched underclad layer having a projection underneath the waveguide. The waveguide having stress gradients and the overetched underclad layer having stress gradients.

BRIEF DESCRIPTION OF THE DRAWINGS

The present invention will be more clearly understood from the following description taken in conjunction with the accompanying drawings in which like reference numerals designate similar or corresponding elements, regions and portions and in which:

FIGS. 1, 7 and 8 illustrate the preferred embodiment of the present invention in forming a waveguide having an underclad layer overetch.

DETAILED DESCRIPTION OF THE PREFERRED EMBODIMENT

Method/Problem Known to the Inventors—Not to be Considered Prior Art for the Purposes of the Present Invention Planar Lightwave Circuit (PLC) is the technology of constructing optical devices on substrates similar to making semiconductor devices or magnetic heads. Optical waveguides of silica are formed on either silica substrates or silicon substrates. Such optical waveguides, are generally rectangular in shape and are formed by employing an etching process such as, for example, a reactive-ion etch (RIE) process.

The PLC process begins with the deposition of a layer of underclad material on the substrate followed by a layer of core material. A pattern of waveguides of the optical device to be formed is etched into the core layer, preferably by using a mask. The overclad material is then deposited to fill the space around the waveguides and also to provide a layer on top of the waveguides. The refractive index of the core layer is generally higher than that of the underclad material, while the refractive index of the overclad material closely matches that of the underclad material.

During film deposition and subsequent annealing steps, thermal stresses develop in the various layers due to the mismatch in the thermal expansion values between the substrate and the layer materials, i.e. the underclad material layer/core layer/overclad material layer. Of particular interest are the stresses created in the core layer since the waveguides are formed in the core layer.

In the instance of using a silicon substrate, since the thermal expansion coefficient of the silicon substrate is higher than that of the silica core, the stress in the plane of the silica core film is large and compressive whereas the stress in the direction normal to that plane is small. The stress difference in these two directions causes the refractive index values to be different resulting in stress-induced birefringence. The wave propagation constants will be different depending upon the direction of polarization of the wave making the device polarization sensitive. The birefringence or the polarization sensitivity is undesirable for most optical devices.

Simulations Conducted by the Inventors for Stress Modeling

FIGS. 1 to 6 illustrate a method and simulations conducted by the inventors for stress modeling and are not to be considered as prior art against the present invention.

Figure 1:
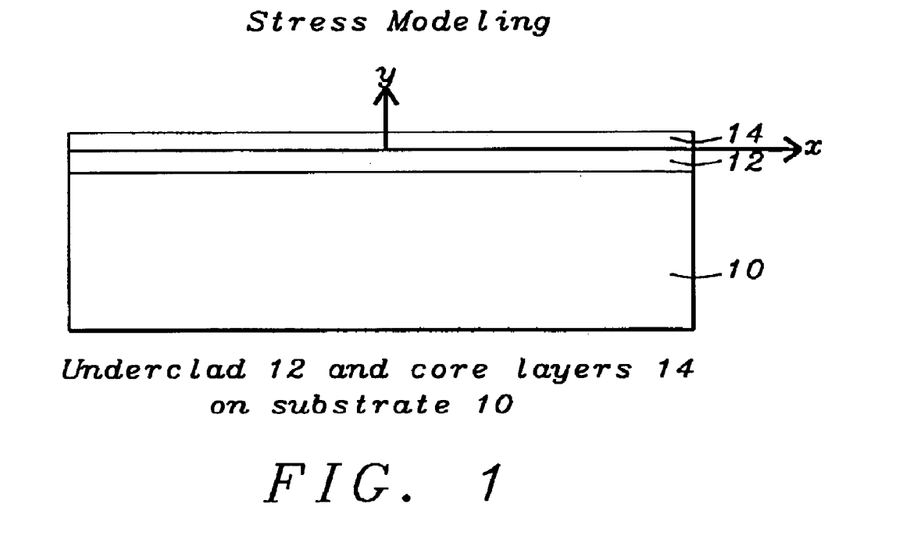
FIGS. 1 and 2 schematically illustrate a method of forming a waveguide used for stress modeling.

Common Initial Structure—FIG. 1

FIG. 1 illustrates a substrate 10 having an underclad layer 12 formed thereupon and a core layer 14 form upon the underclad layer 12. Thermal stresses in the layers 10, 12, 14 were calculated using Finite Element™ simulations made/sold by ANSYS Inc., 27S Technology Drive, Cannonsburg, Pa. 15317.

Substrate 10 is preferably comprised of silicon, silicon oxide, glass or GaAs and is more preferably silicon. Underclad layer 12 is preferably comprised of silica or GaAsP and is more preferably silica. Core layer/film 14 is preferably comprised of: silica; Ge doped silica; or B, P and Ge doped silica; and is more preferably silica.

The approximate thicknesses and mechanical properties of the various layers 10, 12, 14 used in these simulations are as follows in Table I:

TABLE I

| Layer | Thickness | Coefficient of thermal expansion | Elastic modulus | Poisson's ratio |
|---|---|---|---|---|
| Substrate 10 | 1.00 mm | $4 \times 10^{-6}/°$ C. | 130,000 MPa | 0.27 |
| Underclad 12 | 15.00 $\mu$m | $0.5 \times 10^{-6}/°$ C. | 73,000 MPa | 0.17 |
| Core 14 | 6.00 $\mu$m | $1 \times 10^{-6}/°$ C. | 73,000 MPa | 0.17 |

For silica waveguides, the devices are annealed at about 1080° C. When cooled down to room temperature, the temperature delta for thermal stresses therefore is −1060 C. Since the thermal expansion coefficient of the substrate 10, is greater than that of the underclad layer 12 and the core layer 14, at room temperature the wafer will have a bow that is convex as viewed from the core film side. The calculated in-plane (xz plane) (the z axis is perpendicular to the paper) stress in the core film 14 after annealing was determined to be about 287 MPa (compressive) and in the underclad layer 12 it was about 321 MPa (compressive). These in-plane stresses are constant throughout the films 12, 14 except in small regions near the wafer edge. The normal stress (y direction) is very small.

Figure 2:
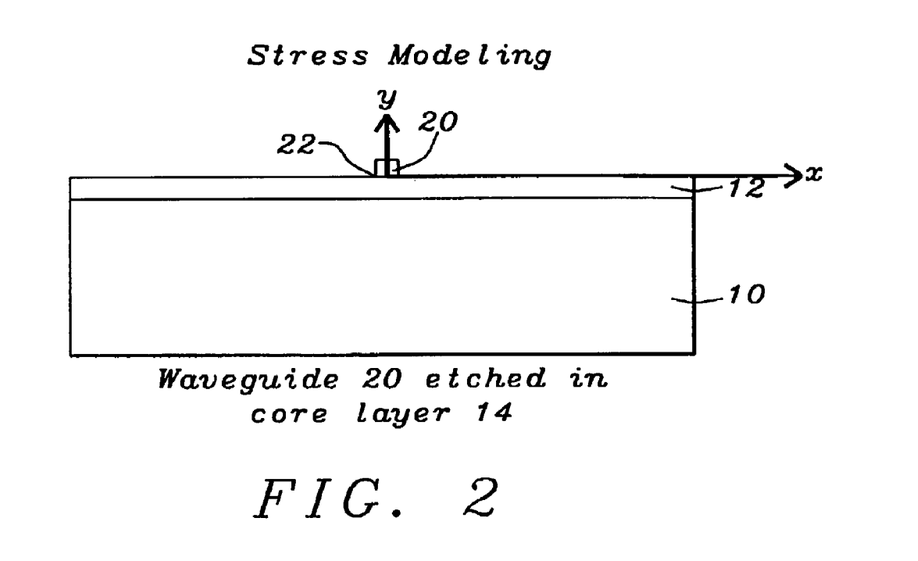

Formation of Waveguide 20—FIG. 2

FIG. 2 illustrates a cross-sectional view of a single waveguide pattern for the optical device etched in the core layer 14 which the inventors used for stress modeling. The waveguide 20 (formed from patterning the core film 14 of FIG. 1) is about 6 $\mu$m wide and the light propagation direction is in the z-direction which is normal to the plane of FIG. 2. As the core film material from the core film 14 is removed during patterning/etching, the bow of the wafer will be significantly reduced although the stresses will remain high. In fact, the maximum stress in the waveguide 20, which occurs at the underclad-waveguide interface 22, is actually increased due to stress concentration at the interface 22. While the wafer bow is undesirable due to wafer handling concerns during subsequent processing, the stress in the waveguide 20 actually affects the optical performance due the stress-optics effects.

The inventors have determined that the stresses in the waveguide 20 are significantly changed from the full-film stress due to the free surfaces created during etching. This stress has three (3) components ($\sigma_{xx}$, $\sigma_{yy}$ and $\sigma_{zz}$) along the three (3) respective axes (x, y and z). These components approximately equal the 3 principal stresses.

Figure 3:
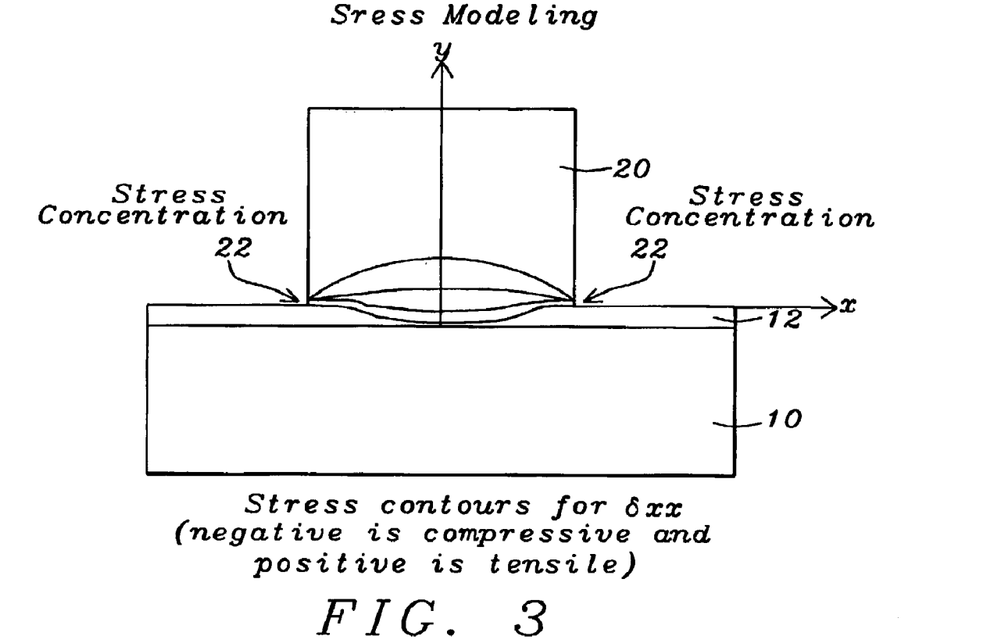
FIGS. 3 and 4 illustrate x and y stress contours for the waveguide of FIG. 2.
Figure 4:
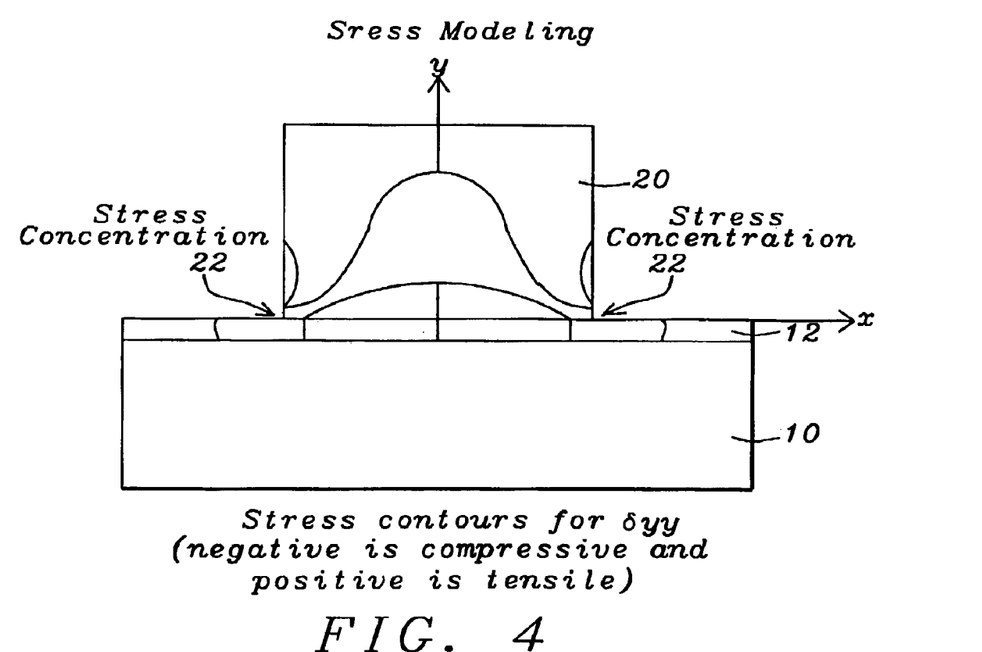

Stress Contours of $\sigma_{xx}$ and $\sigma_{yy}$ in the Waveguide 20—FIGS. 3 and 4

FIGS. 3 and 4 show stress contours of $\sigma_{xx}$, and $\sigma_{yy}$, respectively, for the waveguide of FIG. 2. The stress contours $\sigma_{xx}$, $\sigma_{yy}$, are shown for the waveguide 20 and for a small region of the underclad layer 12 at the interface 22. As illustrated in FIGS. 3 and 4, the stresses are very high at, and near, the underclad-waveguide interface 22 and reduce significantly away from the interface 22. The top half of the waveguide 20 has very low stress in both the x and y directions.

Refractive Index

The refractive index of the waveguide 20 is affected by these stresses according to the following formulas:

$n_x = n_0 - C_1\sigma_{xx} - C_2(\sigma_{yy} + \sigma_{zz})$ $n_y = n_0 - C_1\sigma_{yy} - C_2(\sigma_{xx} + \sigma_{zz})$ where $n_0$ is the unstressed refractive index and $C_1$ and $C_2$ are the stress-optic (photoelastic) constants.

For silica:

$n_0 = 1.4458$;

$C_1 = 0.756 \times 10^{-6}$ (MPa)$^{-1}$; and $C_2 = 4.181 \times 10^{-6}$ (MPa)$^{-1}$.

Stress-Induced Birefringence (Bs)

The stress-induced birefringence (Bs) is defined as:

$Bs = n_x - n_y = (C_2 - C_1)(\sigma_{xx} - \sigma_{yy})$

So for silica:

$Bs 3.425 \times 10^{-6} (\sigma_{xx} - \sigma_{yy})$.

The stress-induced birefringence (Bs) in waveguides causes Polarization Dependent Wavelength (PDW) shifts. Since the stresses $\sigma_{xx}$ and $\sigma_{yy}$ change the refractive index in the x and y directions, the wavelength, which is inversely proportional to the refractive index, will be different in the x and y directions. The wavelength shift, and thus the wave propagation constants, will depend upon the direction of polarization of the light. This polarization sensitivity is undesirable for many types of optical devices.

Figure 5:
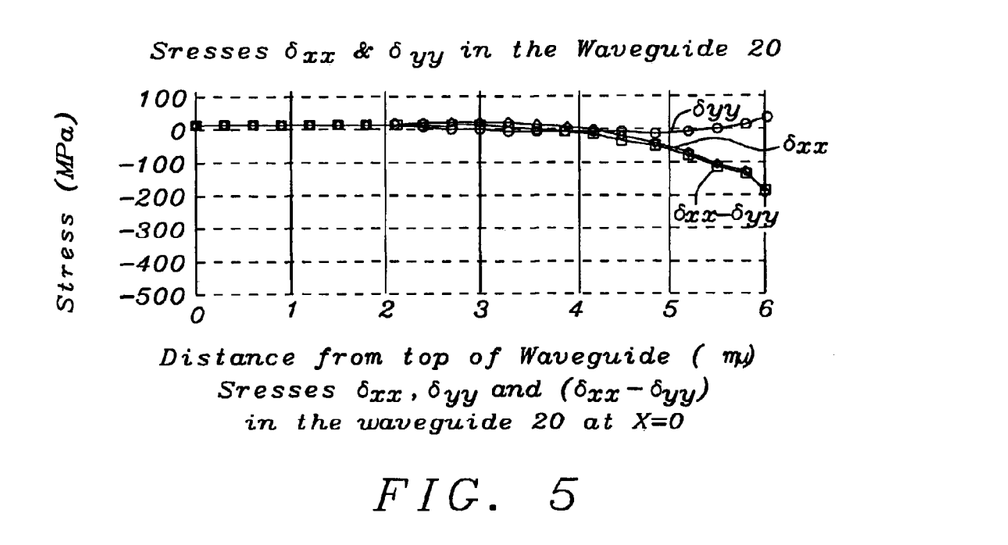
FIGS. 5 and 6 are respective plots of $\sigma_{xx}$, $\sigma_{yy}$ and $(\sigma_{xx}-\sigma_{yy})$ at: the center of the waveguide of FIG. 2; and at the edge of the waveguide of FIG. 2.
Figure 6:
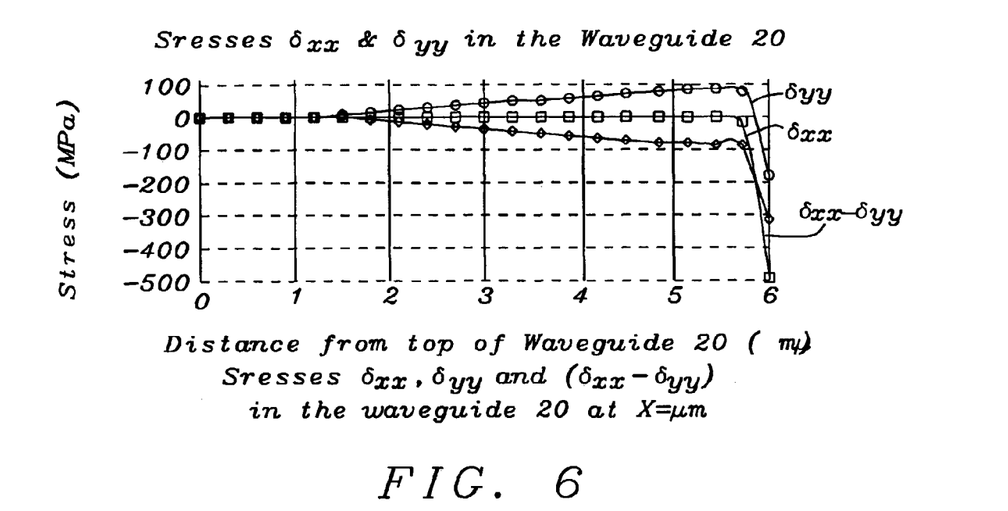

Plots $\sigma_{xx}$, $\sigma_{yy}$ and $\sigma_{xx} - \sigma_{yy}$ for Waveguide 20 at x=0 and x=0.5× waveguide Width, Respectively—FIGS. 5 and 6

FIGS. 5 and 6 are plots of $\sigma_{xx}$, $\sigma_{yy}$ and ($\sigma_{xx} - \sigma_{yy}$) through the thickness of the waveguide 20 going from top to bottom, at: the center (where x=0); and at the edge (where x=0.5× waveguide width), respectively. There are regions of high stress concentration (see FIG. 3) due to sharp corners where the stress cannot be calculated exactly. In practice, there will be some rounding at the corners due to the etching process of core layer 14 to form waveguide 20 so that the localized stress at the corners will be reduced. In finite element modeling, the stress value will be determined by the size of the elements at the corners. The maximum stress $\sigma_{xx}$ in the waveguide 20 is about 500 MPa (compressive) and the maximum value of ($\sigma_{xx} - \sigma_{yy}$) is in excess of 300 MPa (compressive). The change in the refractive index and the birefringence (Bs) therefore is of the order of $10^{-3}$ which is significant.

The birefringence (Bs) and therefore the stresses $\sigma_{xx}$, $\sigma_{yy}$ and $\sigma_{zz}$ need to be an order of magnitude smaller for good optical performance.

The stress contours $\sigma_{xx}$, $\sigma_{yy}$ illustrated in FIGS. 3 and 4 show high stresses near the underclad-waveguide interface 22 which reduce rapidly away from the interface 22. In fact, stress gradients were found to exist up to a distance of about half the width of the waveguide 20, and beyond that the stresses are nearly zero.

Method of the Present Invention—FIGS. 7 to 12

The inventors have discovered that by overetching the underclad layer 12 by just increasing the etch time when forming the waveguide 20' of the present invention, the stresses in the active part of the waveguide (core) 20' are significantly reduced, thus improving the stress-induced birefringence and the polarization dependent loss.

Initial Structure—FIG. 1

The initial structure in the method of the present invention is also shown in FIG. 1 which is also the initial structure in the formation of the waveguide 20 formed by the inventors in conducting their stress modeling simulations. The approximate thicknesses and mechanical properties of the various layers 10, 12, 14 are the same as describe hereabove and in Table I.

As shown in FIG. 1, substrate 10 having an underclad layer 12 formed thereupon and a core layer 14 formed upon the underclad layer 12. The thermal stresses in the layers described hereafter were calculated using Finite Element™ simulations.

Substrate 10 is preferably comprised of silicon, silicon oxide, glass or GeAs and is more preferably silicon. Underclad layer 12 is preferably comprised of silica. Core layer/film 14 is preferably comprised of: silica; Ge doped silica; or B, P and Ge doped silica; and is more preferably silica.

Substrate 10 is preferably from about 0.20 to 1.50 mm thick and is more preferably about 1.00 mm thick. Underclad layer 12 is preferably from about 5.00 to 25.00 μm thick and is more preferably about 15.00 μm thick. Core layer 14 is preferably from about 0.3.00 to 10.00 μm thick and is more preferably about 6.00 μm thick.

Figure 7:
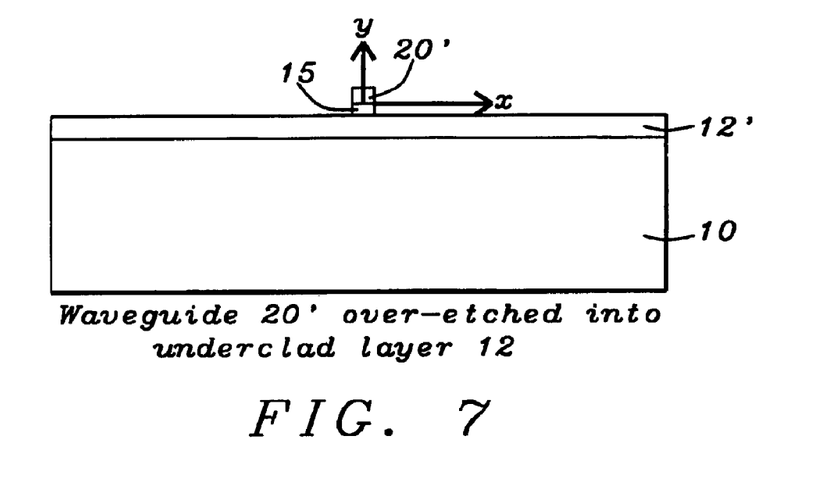

Formation of Waveguide 20'/Overetch of Underclad Layer 12—FIG. 7

As shown in FIG. 7, core layer/film 14 is patterned, preferably by etching, to form waveguide 20' while overetching underclad layer 12 to form an overetched underclad layer 12' having a projection 15 under waveguide 20'.

The underclad layer 12 is preferably overetched from about 0.50 to 6.00 μm, more preferably from about 2.00 to 4.00 μm and most preferably about 3.00 μm. The amount by which underclad layer 12 is overetched relates to the width of waveguide 20' to be formed and is preferably about half of the width of the waveguide 20' ((i.e. about (0.5)× (waveguide 20' width)). It may be greater although that would impact upon the process time and would reduce the benefit.

Modeling results show that the maximum benefit to the stress reduction is achieved at about one-half the waveguide width. At etch depths larger than about one-half the waveguide width, the stress is still being reduced although the gain to the performance is diminished. Additionally, the increased process time needed to etch greater that about one-half the waveguide width may have a negative impact.

Figure 8:
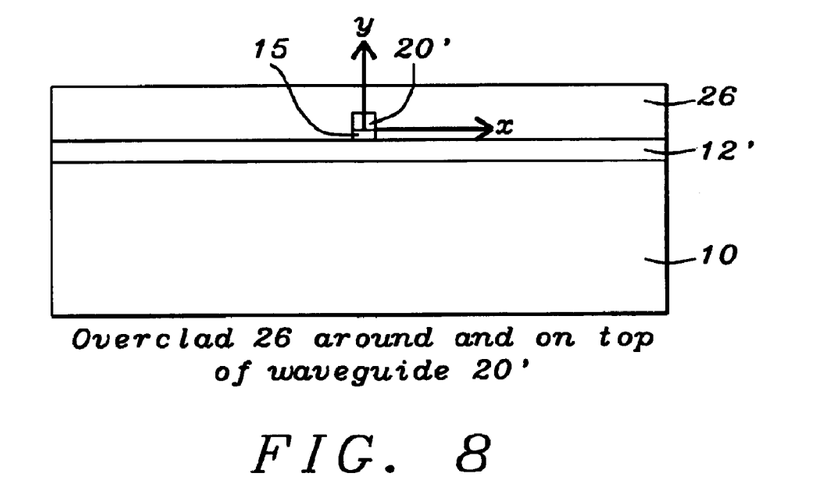

Formation of Overclad Layer 26—FIG. 8.

As shown in FIG. 8, an overclad layer 26 is then formed over the waveguide 20' and the overetched underclad layer 12' to a thickness above the overetched underclad layer 12' of preferably from about 0.50 to 6.00 μm and more preferably from about 2.00 to 4.00 μm.

Overclad layer 26 is preferably comprised of a material that optically matches the underclad layer 12/overetched underclad layer 12' and is preferably comprised of silica, glass or GaAs and is more preferably silica.

The addition of overclad layer 26 will generally alter the stresses in the waveguide 20', however the overclad material is chosen to be very compliant so as not to have a significant effect upon the waveguide 20' stresses, so that the stress benefits of overetching underclad layer 12 are applicable with the use of overclad layer 26 as well.

Figure 9:
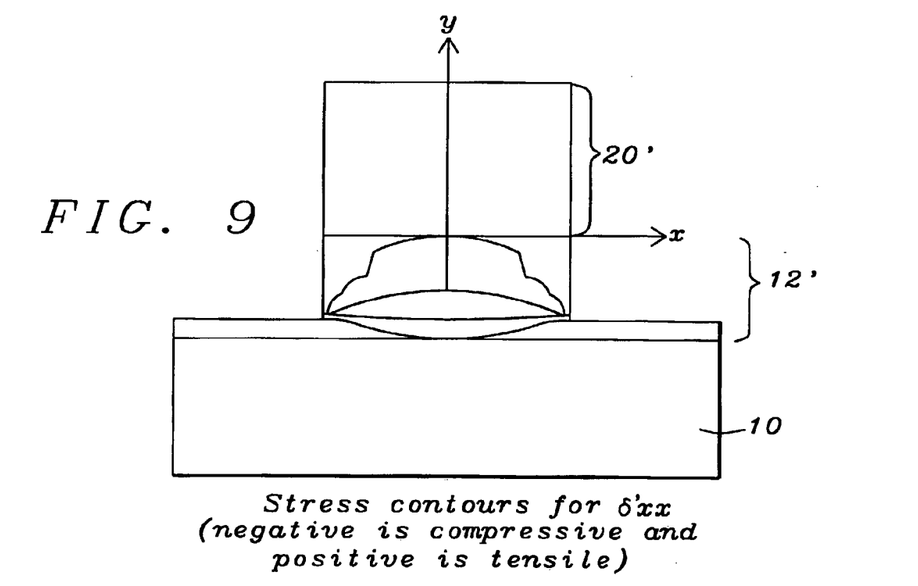
FIGS. 9 and 10 are x and y stress contours for the waveguide of FIGS. 7 and 8 having an underclad layer overetch in accordance with the method of the present invention.
Figure 10:
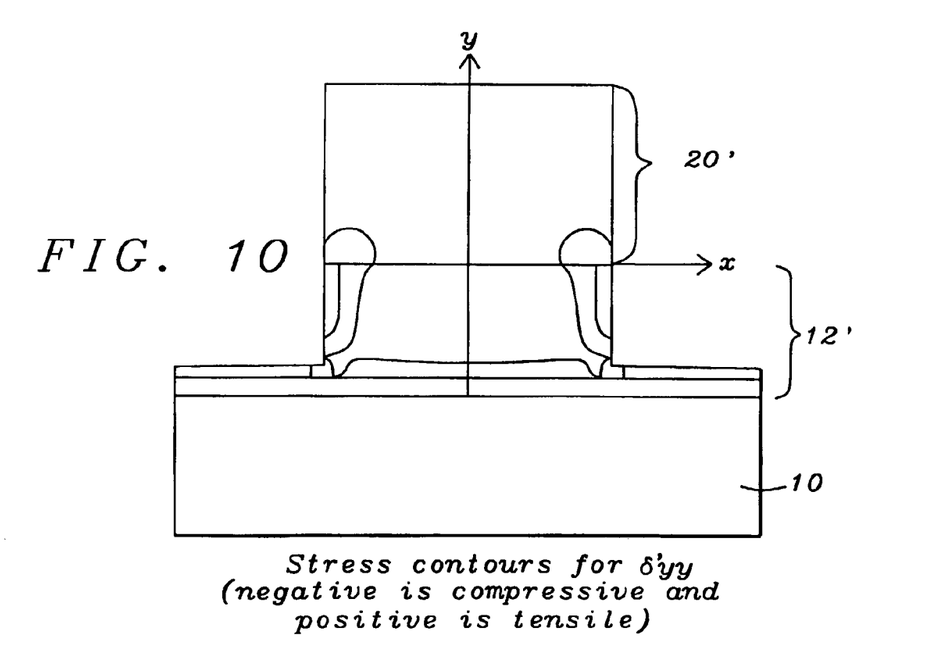

Stress Contours of $\sigma_{xx}'$ and $\sigma_{yy}'$ in the Waveguide 20' and the Overetched Underclad Layer 12'—FIGS. 9 and 10

For an overetch of 3 μm into underclad layer 12 with a waveguide 20' having a width of about 6 μm, FIGS. 9 and 10 show stress contours $\sigma_{xx}'$ and $\sigma_{yy}'$, respectively, for the waveguide 20' and the overetched underclad layer 12'. As shown, the stress gradients exist only in the overetched underclad layer 12' with the core waveguide 20' being nearly stress-free.

The deeper the underclad layer 12 is overetched, and thus the thicker the underclad projection 15, the further removed the stress gradients will be from the active part of the waveguide 20'.

Figure 11:
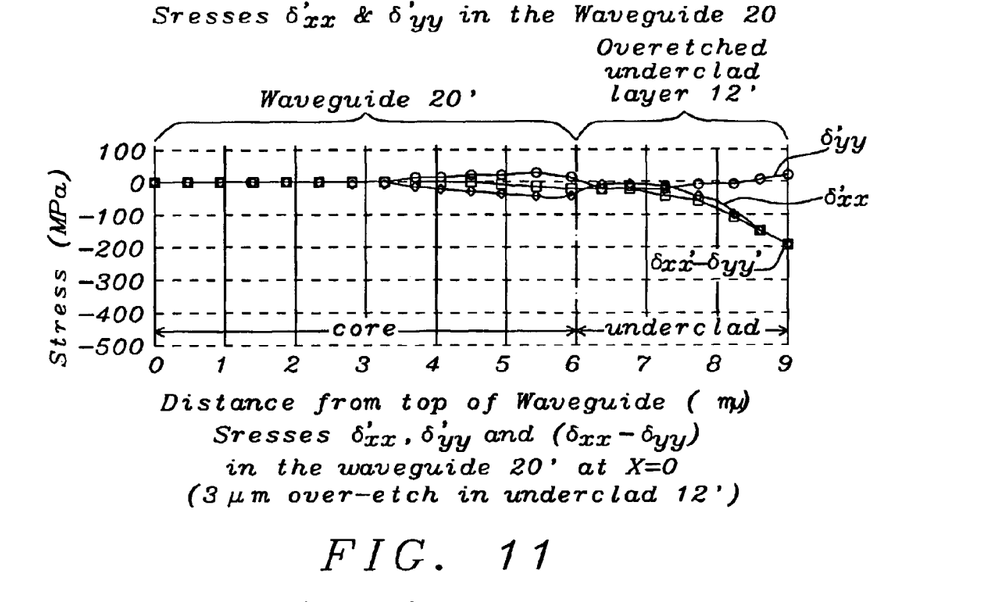
FIGS. 11 and 12 are respective plots of $\sigma_{xx}$, $\sigma_{yy}$ and $(\sigma_{xx}-\sigma_{yy})$ at: the center of the waveguide of FIGS. 7 and 8 having an underclad layer overetch; and at the edge of the waveguide of FIGS. 7 and 8 having an underclad layer overetch in accordance with the method of the present invention.
Figure 12:
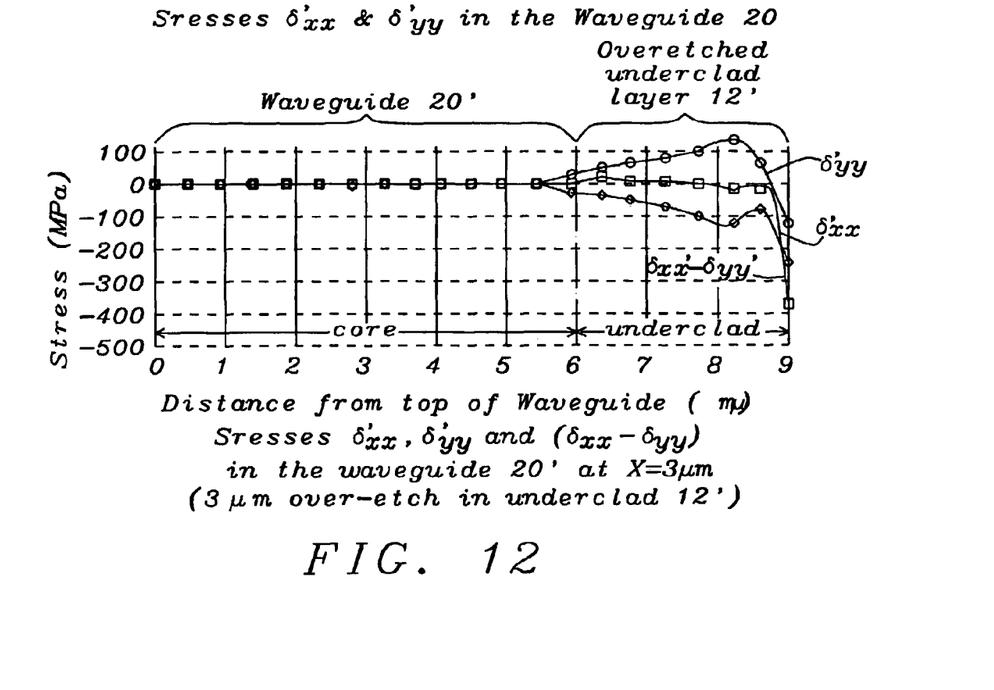

Plots of $\sigma_{xx}'$, $\sigma_{yy}'$ and $\sigma_{xx}'-\sigma_{yy}'$ for a 3 μOveretching into Underclad Layer 12–FIGS. 11 and 12

For an overetch of 3 μinto underclad layer 12 with a waveguide 20' having a width of about 6 μm, FIGS. 11 and 12 are plots of $\sigma_{xx}'$, $\sigma_{yy}'$ and $(\sigma_{xx}'-\sigma_{yy}')$ through the thickness of the waveguide 20' going from top to bottom, at: the center (where x=0) (3 μm overetch into underclad layer 12); and at the edge (where x=3 μm) (3 μm overetch into underclad layer 12), respectively.

These plots show that the stress gradients are mostly shifted into the projection 15/overetched region of the overetched underclad layer 12' and that the stresses in the core wavelength 20' are nearly zero.

It is noted that the waveguide 20' made in accordance with the method of the present invention is stress-free in $\sigma_{xx}'$ and $\sigma_{yy}'$ only. The overetched underclad layer 12' would also remove the stress gradients in $\sigma_{zz}'$ to make the stress uniform but $\sigma_{zz}'$ is non-zero. However, $\sigma_{zz}'$ has no effect on polarization sensitivity and birefringence (Bs) (in accordance with the formula Bs=$n_x-n_y$=$(C_2-C_1)(\sigma_{xx}'-\sigma_{yy}')$) disclosed above).

Advantages of the Present Invention

The advantages of one or more embodiments of the present invention include:

1. the stress-induced birefringence of the waveguide is reduced;
2. the polarization sensitivity of the waveguide is reduced;
3. the waveguide/overetched underclad layer is achieved by only increasing the etch time;
4. the waveguide/overetched underclad layer is achieved without any additional process steps;
5. the waveguide/overetched underclad layer is achieved without alteration of the materials employed in conventional waveguide formation processes; and
6. the waveguide is nearly stress-free.

While particular embodiments of the present invention have been illustrated and described, it is not intended to limit the invention, except as defined by the following claims.

We claim:

1. A method of forming a waveguide, comprising the steps of:
    providing a structure;
    forming an underclad layer over the structure;
    forming a core layer over the underclad layer; and
    patterning:
    the core layer to form the waveguide; and
    partially into the underclad layer, forming an overetched underclad layer having a projection underneath the waveguide; the waveguide having stress gradients and the overetched underclad layer having stress gradients.

2. The method of claim 1, wherein the structure is comprised of silicon, silicon oxide, glass or GaAs; the underclad layer is comprised of silica or GaAsP; and the core layer is comprised of silica, Ge doped silica, or B, P and Ge doped silica.

3. The method of claim 1, wherein the structure is comprised of silicon; the underclad layer is comprised of silica; and the core layer is comprised of silica.

4. The method of claim 1, wherein the structure is from about 0.20 to 1.50 mm thick; the underclad layer is from about 5.00 to 25.00 μm thick and the core layer is from about 3.00 to 10.00 μm thick.

5. The method of claim 1, wherein the structure is about 1.00 mm thick, the underclad layer is about 15.00 μm thick and the core layer is about 6.00 μm thick.

6. The method of claim 1, wherein the underclad layer has a width and the underclad layer is overetched about one-half its width.

7. The method of claim 1, wherein the underclad layer has a width of about 6.00 μm and is overetched about 3.00 μm.

8. The method of claim 1, wherein the waveguide is from about 0.50 to 6.00 μm wide.

9. The method of claim 1, wherein the waveguide is about 6.00 μm wide.

10. The method of claim 1, including the step of forming an overclad layer over the waveguide and the overetched underclad layer.

11. The method of claim 1, including the step of forming an overclad layer over the waveguide and the overetched underclad layer; the overclad layer being comprised of a material that optically matches the underclad layer.

12. The method of claim 1, including the step of forming an overclad layer over the waveguide and the overetched underclad layer; the overclad layer being comprised of silica, glass or GaAs.

13. The method of claim 1, including the step of forming an overclad layer over the waveguide and the overetched underclad layer; the overclad layer being comprised of silica.

14. The method of claim 1, including the step of forming an overclad layer over the waveguide and the overetched underclad layer; the overclad layer having a thickness of from about 0.50 to 6.00 μm.

15. The method of claim 1, including the step of forming an overclad layer over the waveguide and the overetched underclad layer; the overclad layer having a thickness of from about 2.00 to 4.00 μm.

16. The method of claim 1, wherein the overetching of the underclad layer lowers the stress gradients from the waveguide into the projection of the overetched underclad layer.

17. The method of claim 1, wherein the stress-induced birefringence of the waveguide is reduced.

18. The method of claim 1, wherein the polarization sensitivity of the waveguide is reduced.

19. The method of claim 1, wherein the coefficient of thermal expansion for the substrate and the core layer are different.

20. A method of forming a waveguide, comprising the steps of:
provided a structure;
forming an underclad layer over the structure;
forming a core layer over the underclad layer;
patterning:
the core layer to form the waveguide; and
partially into the underclad layer, forming an overetched underclad layer having a projection underneath the waveguide; the waveguide having stress gradients and the overetched underclad layer having stress gradients; and
forming an overclad layer over the waveguide and the overetched underclad layer.

21. The method of claim 20, wherein the structure is comprised of silicon, silicon oxide, glass or GaAs; the underclad layer is comprised of silica or GaAsP; and the core layer is comprised of silica, Ge doped silica, or B, P and Ge doped silica.

22. The method of claim 20, wherein the structure is comprised of silicon; the underclad layer is comprised of silica; and the core layer is comprised of silica.

23. The method of claim 20, wherein the structure is from about 0.20 to 1.50 mm thick; the underclad layer is from about 5.00 to 25.00 μm thick and the core layer is from about 3.00 to 10.00 μm thick.

24. The method of claim 20, wherein the structure is about 1.00 μmm thick, the underclad layer is about 15.00 μm thick and the core layer is about 6.00 μm thick.

25. The method of claim 20, wherein the underclad layer has a width and the underclad layer is overetched about one-half its width.

26. The method of claim 20, wherein the underclad layer has a width of about 6.00 μm and is overetched about 3.00 μm.

27. The method of claim 20, wherein the waveguide is from about 0.50 to 6.00 μm wide.

28. The method of claim 20, wherein the waveguide is about 6.00 μm wide.

29. The method of claim 20, including the step of forming an overclad layer over the waveguide and the overetched underclad layer.

30. The method of claim 20, including the step of forming an overclad layer over the waveguide and the overetched underclad layer; the overclad layer being comprised of a material that optically matches the underclad layer.

31. The method of claim 20, including the step of forming an overclad layer over the waveguide and the overetched underclad layer; the overclad layer being comprised of silica, glass or GaAs.

32. The method of claim 20, including the step of forming an overclad layer over the waveguide and the overetched underclad layer; the overclad layer being comprised of silica.

33. The method of claim 20, including the step of forming an overclad layer over the waveguide and the overetched underclad layer; the overclad layer having a thickness of from about 0.50 to 6.00 μm.

34. The method of claim 20, including the step of forming an overclad layer over the waveguide and the overetched underclad layer; the overclad layer having a thickness of from about 2.00 to 4.00 μm.

35. The method of claim 20, wherein the overetching of the underclad layer lowers the stress gradients from the waveguide into the projection of the overetched underclad layer.

36. The method of claim 20, wherein the stress-induced birefringence of the waveguide is reduced.

37. The method of claim 20, wherein the polarization sensitivity of the waveguide is reduced.

38. The method of claim 20, wherein the coefficient of thermal expansion for the substrate and the core layer are different.

39. A method of forming a waveguide, comprising the steps of:
providing a structure;
forming an underclad layer over the structure; the underclad layer having a width;
forming a core layer over the underclad layer; and
patterning:
the core layer to form the waveguide; and
partially into the underclad layer about one-half of its width, forming an overetched underclad layer having a projection underneath the waveguide; the waveguide having stress gradients and the overetched underclad layer having stress gradients.

39. The method of claim 38, wherein the structure is comprised of silicon, silicon oxide, glass or GaAs; the underclad layer is comprised of silica or GaAsP; and the core layer is comprised of silica, Ge doped silica, or B, P and Ge doped silica.

40. The method of claim 38, wherein the structure is comprised of silicon; the underclad layer is comprised of silica; and the core layer is comprised of silica.

41. The method of claim 38, wherein the structure is from about 0.20 to 1.50 μmm thick; the underclad layer is from about 5.00 to 25.00 μm thick and the core layer is from about 3.00 to 10.00 μm thick.

42. The method of claim 38, wherein the structure is about 1.00 μmm thick, the underclad layer is about 15.00 μm thick and the core layer is about 6.00 μm thick.

43. The method of claim 38, wherein the underclad layer has a width of about 6.00 μm and is overetched about 3.00 μm.

44. The method of claim 38, wherein the waveguide is from about 0.50 to 6.00 μm wide.

45. The method of claim 38, wherein the waveguide is about 6.00 μm wide.

46. The method of claim 38, including the step of forming an overclad layer over the waveguide and the overetched underclad layer.

47. The method of claim 38, including the step of forming an overclad layer over the waveguide and the overetched underclad layer; the overclad layer being comprised of a material that optically matches the underclad layer.

48. The method of claim 38, including the step of forming an, overclad layer over the waveguide and the overetched underclad layer; the overclad layer being comprised of silica, glass or GaAs.

49. The method of claim 38, including the step of forming an overclad layer over the waveguide and the overetched underclad layer; the overclad layer being comprised of silica.

50. The method of claim 38, including the step of forming an overclad layer over the waveguide and the overetched underclad layer; the overclad layer having a thickness of from about 0.50 to 6.00 μm.

51. The method of claim 38, including the step of forming an overclad layer over the waveguide and the overetched underclad layer; the overclad layer having a thickness of from about 2.00 to 4.00 μm.

52. The method of claim 38, wherein the overetching of the underclad layer lowers the stress gradients from the waveguide into the projection of the overetched underclad layer.

53. The method of claim 38, wherein the stress-induced birefringence of the waveguide is reduced.

54. The method of claim 38, wherein the polarization sensitivity of the waveguide is reduced.

55. The method of claim 38, wherein the coefficient of thermal expansion for the substrate and the core layer are different.

56. A method of forming a waveguide, comprising the steps of:
   providing a structure;
   forming an underclad layer over the structure;
   forming a core layer over the underclad layer; and
   patterning:
      the core layer to form the waveguide; the waveguide having a width; and
   partially into the underclad layer to about one-half of the width of the waveguide, to form an overetched underclad layer having a projection underneath the waveguide; the waveguide having stress gradients and the overetched underclad layer having stress gradients.

57. The method of claim 56, wherein the structure is comprised of silicon, silicon oxide, glass or GaAs; the underclad layer is comprised of silica or GaAsP; and the core layer is comprised of silica, Ge doped silica, or B, P and Ge doped silica.

58. The method of claim 56, wherein the structure is comprised of silicon; the underclad layer is comprised of silica; and the core layer is comprised of silica.

59. The method of claim 56, wherein the structure is from about 0.20 to 1.50 μmm thick; the underclad layer is from about 5.00 to 25.00 μm thick and the core layer is from about 3.00 to 10.00 μm thick.

60. The method of claim 56, wherein the structure is about 1.00 μmm thick, the underclad layer is about 15.00 μm thick and the core layer is about 6.00 μm thick.

61. The method of claim 56, wherein the waveguide has a width of about 6.00 μm and the underclad layer is overetched about 3.00 μm.

62. The method of claim 56, wherein the waveguide is from about 0.50 to 6.00 μm wide.

63. The method of claim 56, wherein the waveguide is about 6.00 μm wide.

64. The method of claim 56, including the step of forming an overclad layer over the waveguide and the overetched underclad layer.

65. The method of claim 56, including the step of forming an overclad layer over the waveguide and the overetched underclad layer; the overclad layer being comprised of a material that optically matches the underclad layer.

66. The method of claim 56, including the step of forming an overclad layer over the waveguide and the overetched underclad layer; the overclad layer being comprised of silica, glass or GaAs.

67. The method of claim 56, including the step of forming an overclad layer over the waveguide and the overetched underclad layer; the overclad layer being comprised of silica.

68. The method of claim 56, including the step of forming an overclad layer over the waveguide and the overetched underclad layer; the overclad layer having a thickness of from about 0.50 to 6.00 μm.

69. The method of claim 56, including the step of forming an overclad layer over the waveguide and the overetched underclad layer; the overclad layer having a thickness of from about 2.00 to 4.00 μm.

70. The method of claim 56, wherein the overetching of the underclad layer lowers the stress gradients from the waveguide into the projection of the overetched underclad layer.

71. The method of claim 56, wherein the stress-induced birefringence of the waveguide is reduced.

72. The method of claim 56, wherein the polarization sensitivity of the waveguide is reduced.

73. The method of claim 56, wherein the coefficient of thermal expansion for the substrate and the core layer are different.

74. A waveguide structure, comprising:
   a structure;
   an overetched underclad layer over the structure; the overetched underclad layer having a projection; and
   a patterned core layer over the overetched underclad layer projection; the patterned core layer forming the waveguide; the waveguide having a width; ; the waveguide having stress gradients and the overetched underclad layer having stress gradients;
wherein the overetched underclad layer projection projects above the overetched underclad layer to about one-half the width of the waveguide.

75. The waveguide structure of claim 74, wherein the structure is comprised of silicon, silicon oxide, glass or GaAs; the underclad layer is comprised of silica or GaAsP; and the core layer is comprised of silica, Ge doped silica, or B, P and Ge doped silica.

76. The waveguide structure of claim 74, wherein the structure is comprised of silicon; the underclad layer is comprised of silica; and the core layer is comprised of silica.

77. The waveguide structure of claim 74, wherein the structure is from about 0.20 to 1.50 μmm thick; the underclad layer is from about 5.00 to 25.00 μm thick and the core layer is from about 3.00 to 10.00 μm thick.

78. The waveguide structure of claim 74, wherein the structure is about 1.00 μmm thick, the underclad layer is about 15.00 μm thick and the core layer is about 6.00 μm thick.

79. The waveguide structure of claim 74, wherein the waveguide has a width of about 6.00 μm and the underclad layer is overetched about 3.00 μm.

80. The waveguide structure of claim 74, wherein the waveguide is from about 0.50 to 6.00 μm wide.

81. The waveguide structure of claim 74, wherein the waveguide is about 6.00 μm wide.

82. The waveguide structure of claim 74, including the step of forming an overclad layer over the waveguide and the overetched underclad layer.

83. The waveguide structure of claim 74, including the step of forming an overclad layer over the waveguide and the overetched underclad layer; the overciad layer being comprised of a material that optically matches the underclad layer.

84. The waveguide structure of claim 74, including the step of forming an overclad layer over the waveguide and the overetched underclad layer; the overclad layer being comprised of silica, glass or GaAs.

85. The waveguide structure of claim 74, including the step of forming an overclad layer over the waveguide and the overetched underclad layer; the overclad layer being comprised of silica.

86. The waveguide structure of claim 74, including the step of forming an overclad layer over the waveguide and the overetched underclad layer; the overclad layer having a thickness of from about 0.50 to 6.00 μm.

87. The waveguide structure of claim 74, including the step of forming an overclad layer over the waveguide and the overetched underclad layer; the overclad layer having a thickness of from about 2.00 to 4.00 μm.

88. The waveguide structure of claim 74, wherein the overetching of the underclad layer lowers the stress gradients from the waveguide into the projection of the overetched underclad layer.

89. The waveguide structure of claim 74, wherein the stress-induced birefringence of the waveguide is reduced.

90. The waveguide structure of claim 74, wherein the polarization sensitivity of the waveguide is reduced.

91. The waveguide structure of claim 74, wherein the coefficient of thermal expansion for the substrate and the core layer are different.

* * * * *